US011507524B2

(12) United States Patent
Arakji

(10) Patent No.: US 11,507,524 B2
(45) Date of Patent: Nov. 22, 2022

(54) RTOS/OS ARCHITECTURE FOR CONTEXT SWITCHING THAT SOLVES THE DIMINISHING BANDWIDTH PROBLEM AND THE RTOS RESPONSE TIME PROBLEM USING UNSORTED READY LISTS

(71) Applicant: Mazen Arakji, San Jose, CA (US)

(72) Inventor: Mazen Arakji, San Jose, CA (US)

(*) Notice: Subject to any disclaimer, the term of this patent is extended or adjusted under 35 U.S.C. 154(b) by 0 days.

(21) Appl. No.: 16/578,350

(22) Filed: Sep. 22, 2019

(65) Prior Publication Data

US 2021/0089481 A1 Mar. 25, 2021
US 2021/0397571 A9 Dec. 23, 2021

Related U.S. Application Data

(60) Provisional application No. 62/739,242, filed on Sep. 30, 2018.

(51) Int. Cl.
*G06F 13/26* (2006.01)
*G06F 9/52* (2006.01)

(52) U.S. Cl.
CPC ............... *G06F 13/26* (2013.01); *G06F 9/52* (2013.01)

(58) Field of Classification Search
CPC ..................................... G06F 3/26; G06F 9/52
See application file for complete search history.

(56) References Cited

U.S. PATENT DOCUMENTS

| 6,021,446 | A  | * | 2/2000 | Gentry, Jr. | ............... | G06F 13/24 709/250 |
| 6,061,709 | A  | * | 5/2000 | Bronte | .................. | G06F 9/4812 718/102 |
| 8,006,247 | B2 | * | 8/2011 | Kalman | .................. | G06F 9/461 718/108 |
| 2003/0172190 | A1 | * | 9/2003 | Greenblat | ........... | H04L 12/4637 709/251 |

(Continued)

*Primary Examiner* — Phong H Dang
(74) *Attorney, Agent, or Firm* — Mazen Arakji

(57) ABSTRACT

The present invention is a novel RTOS/OS architecture that changes the fundamental way that context switching is performed. In all prior operating system implementations, context switching required disabling of interrupts. This opens the possibility that data can be lost. This novel approach consists of a context switching method in which interrupts are never disabled. Two implementations are presented. In the first implementation, the cost is a negligible amount of memory. In the second, the cost is only a minimal impact on the context switching time. This RTOS/OS architecture requires specialized hardware. Concretely, an advanced interrupt controller that supports nesting and tail chaining of prioritized interrupts is needed (e.g. the Nested Vectored Interrupt Controller (NVIC) found on many ARM processors). The novel RTOS/OS architecture redefines how task synchronization primitives such as semaphores and mutexes are released. Whereas previous architectures directly accessed internal structures, this architecture does so indirectly by saving information in shared buffers or setting flags, and then activating a low priority software interrupt that subsequently interprets this data and performs all context switching logic. The software interrupt must be set as the single lowest priority interrupt in the system.

2 Claims, 6 Drawing Sheets

(56) References Cited

U.S. PATENT DOCUMENTS

| | | | |
|---|---|---|---|
| 2005/0073606 A1* | 4/2005 | Haydock | G06F 9/30072 |
| | | | 348/425.3 |
| 2007/0022147 A1* | 1/2007 | Bean | G06F 3/0613 |
| 2016/0188366 A1* | 6/2016 | Lipsio, Jr. | G06F 9/4881 |
| | | | 718/103 |
| 2018/0011804 A1* | 1/2018 | Pedersen | G06F 13/1663 |

* cited by examiner

RTOS/OS ARCHITECTURE FOR CONTEXT SWITCHING THAT SOLVES THE DIMINISHING BANDWIDTH PROBLEM AND THE RTOS RESPONSE TIME PROBLEM USING UNSORTED READY LISTS

FIELD OF THE INVENTION

This invention is within the field of computer systems software, and in particular, real-time operating systems and operating systems. It addresses the ability of such systems to retrieve incoming data from external hardware peripherals, and the time it takes for such systems to begin processing this data. Specifically, the invention relates to how interrupts and context switching are implemented in such systems.

BACKGROUND

The ability of a computer to receive data from external hardware sources (peripherals) is a fundamental functionality. In the beginning, computers would simply only ever execute the very next instruction. Within a loop, the computer would check for new data from all peripherals. When a particular peripheral had new data available, then the computer would process it. However, it was discovered that such a system could lead to loss of data. This is true especially as the number of peripherals being monitored increased. The reason for the data loss is straightforward. While the computer is busy processing the data from one peripheral, another peripheral might receive multiple data, effectively overwriting the old value before it was processed.

The solution to this problem was interrupts. This is an actual hardware change to the processor itself. Concretely, new pins were added. These interrupt pins, were essentially new input to the processor. They were each connected to a peripheral. Upon new data being available at a particular peripheral, the interrupt pin connected to that peripheral would be activated. This would cause the computer to, instead of executing the very next instruction as usual, begin executing instructions from a predetermined location in memory. And so, clearly, these instructions (called an interrupt handler) would retrieve the data from the peripheral, store it in a particular buffer in memory set aside for that peripheral for future processing, and then return to the prior, regular, instruction execution. In this specification, the term "interrupt" refers exclusively to external events. With this change to the processor, namely, adding interrupts, the problem of data loss was solved. And so, in a computer system with interrupts, instead of having the computer check for new data from all peripherals as before, the computer could check its own memory, and specifically the memory buffer associated with each peripheral. When a memory buffer of a particular peripheral had new data or even multiple data, the computer could process it.

In addition to being able to retrieve data from peripherals without loss, many computer systems have requirements on how long it can be before the data that has been received and stored by the interrupt handler is finally processed. This is the response time. In the previously described computer system with interrupts, assume that a particular peripheral, peripheral A, is considered to be of the highest priority. That is, when new data is received and stored by the interrupt handler associated with peripheral A, it must be processed as soon as possible. A terrible response time occurs in this scenario: The computer checks the memory buffer associated peripheral A and finds that no new data is available. Then it checks the memory buffer associated with some other, lower priority peripheral, peripheral B, and discovers that it contains new data. In the same instant that the computer then begins to process this data (task B), new data from peripheral A arrives. The interrupt pin connected to peripheral A is activated and the interrupt handler for peripheral A executes, retrieving the data from peripheral A and storing in the memory buffer associated with peripheral A. The interrupt handler then returns to the prior, regular, instruction execution, namely, task B. Unfortunately, of all the peripherals, the time it takes to process the data from peripheral B is the longest. Finally, upon completing task B, the system can check the memory buffer associated with the high priority peripheral A and process it (task A). This system was forced to wait for the longest task to execute from beginning to end before being able to respond to the new data from the high priority peripheral.

The solution to this problem was the context switch. This is in fact the defining characteristic of an RTOS/OS. A context switch is purely a software solution, and in its simplest form would be most easily described by reexamining the previous example: As before, in the same instant that the computer begins the processing of peripheral B's data (task B), new data from peripheral A arrives. And as before, the interrupt handler associated with peripheral A executes. However, after retrieving the data from peripheral A and storing it in the memory buffer associated with peripheral A, a context switch is executed. Instead of returning to the prior, regular processing, namely, task B, the context switch saves this for later, and first executes the processing of peripheral A's data (task A). Thus the response time for processing peripheral A's data is now constant and essentially equal to the context switch time. This solves the unbounded worst case response time for processing peripheral A's data.

The problem with this solution is that during the context switch, interrupts are disabled. When interrupts are disabled, the original problem of data loss is reintroduced. As it exists today and since its inception, all context switches in all operating systems will disable interrupts. An example, which includes a better description of context switching, will illustrate the reason why interrupts must be disabled: Consider three tasks A, B, and C, associated with three peripherals A, B, and C. Assume that task A is the highest priority, while task B is medium priority, and task C is the lowest priority. In the scenario where task C is executing and new data is received in peripheral B, then a context switch will occur which will switch out task C for task B. This in fact involves saving the state of the processor as it was when it was executing task C and updating it with the required state so that when it continues, it will execute task B. The key here is that this requires multiple instructions. If, after saving the state of the processor as it was when it was executing task C, and while in the middle of updating the processor with information from task B (i.e. the processor state now contains new information from task B as well as old information from task C), new data arrives at peripheral A, then in the new context switch that occurs in order to switch out task B for task A, when the old state of the processor is saved, what is actually being saved is not a valid state. Disabling interrupts thus prevents such a scenario from occurring. With interrupts disabled, the saving of the old state and the updating of the new state can always be fully completed. In fact, and without going into further detail, the context switch also involves updating the internal data structures of the RTOS/OS, and this similarly cannot be interrupted lest these structures also be rendered invalid. Although context switches are designed to be relatively short, data can arrive at peripherals at high rates. This will lead to data loss. Modern processors address such concerns by providing hardware buffering at the peripheral itself. Although such solutions might work, an architecture with insufficient peripheral buffering or a system with high data rate bursts that can overwhelm a peripheral buffer will reintroduce the original data loss problem. Furthermore, an RTOS/OS should not internally disable an interrupt that was enabled by the programmer.

The solution to this problem is the novel RTOS/OS architecture in which interrupts are never disabled.

BRIEF SUMMARY OF THE INVENTION

This invention comprises both software and hardware. The required hardware is an advanced interrupt controller that supports nesting and tail chaining of prioritized interrupts. Not all computers include such an interrupt controller. A prime example of such an interrupt controller is the Nested Vectored Interrupt Controller (NVIC) found on many ARM processors. Other interrupt controllers that provide a similar functionality can be used with this novel RTOS/OS architecture. Thus far, operating system software has failed to properly exploit these advanced interrupt controllers. For information about the NVIC, the reader is directed to: http://infocenter.arm.com/help/topic/com.arm.doc.dai0179b/ar01s01s01.html The software consists of a new system for context switching in which interrupts are never disabled. This is accomplished by redefining how task synchronization primitives such as semaphores and mutexes are handled. Instead of explicitly accessing RTOS/OS structures, a low priority software interrupt is activated and in its handler, all context switching logic is performed. However, in addition to and before the regular context switching logic, a determination of which task synchronization primitive has been set/cleared, and thus which tasks are ready to execute must be made. The software interrupt must be set as the single lowest priority interrupt in the system. It can be interrupted at anytime by any interrupt. Since the interrupt controller supports nesting of interrupts, the higher priority interrupt will execute, and then processing will resume in the low priority software interrupt handler. Thus no data can ever be lost.

DETAILED DESCRIPTION OF THE INVENTION

Figure 1:
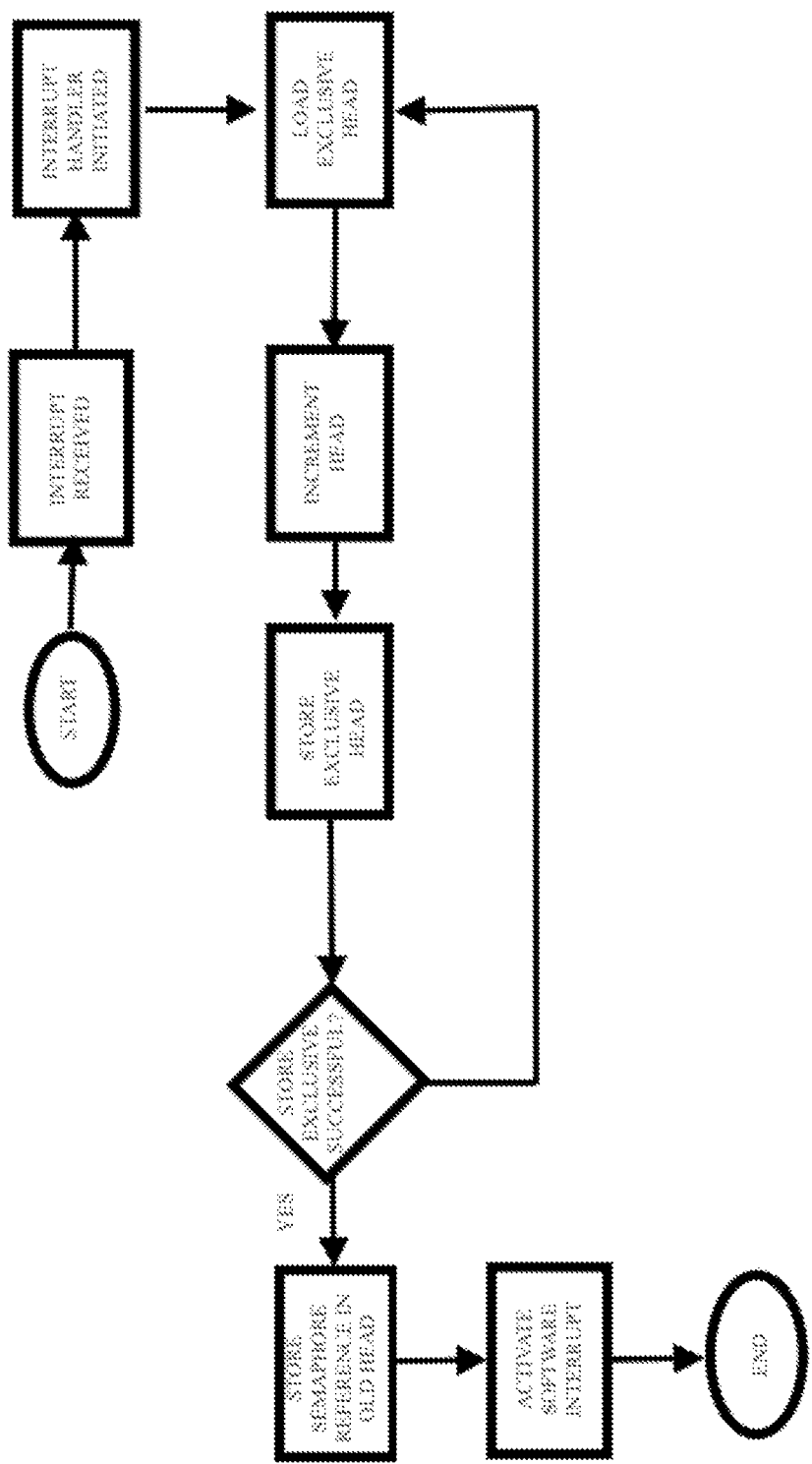
FIG. 1 Implementation 1 depiction of the steps in which a hardware interrupt handler on an ARM architecture could save the semaphore reference and activate the software interrupt.
Figure 2:
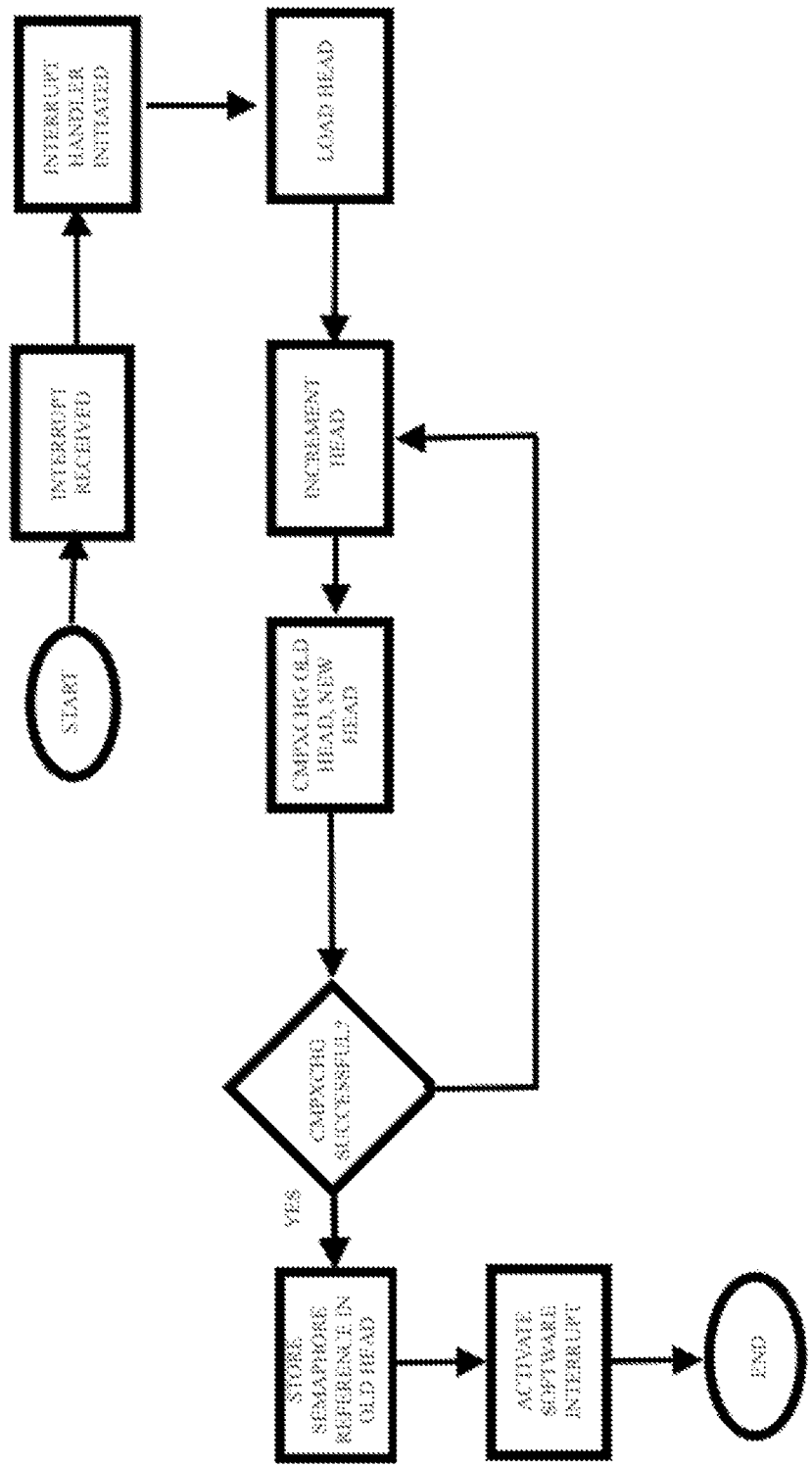
FIG. 2 Implementation 1 depiction of the steps in which a hardware interrupt handler on an x86 architecture could save the semaphore reference and activate the software interrupt.
Figure 3:
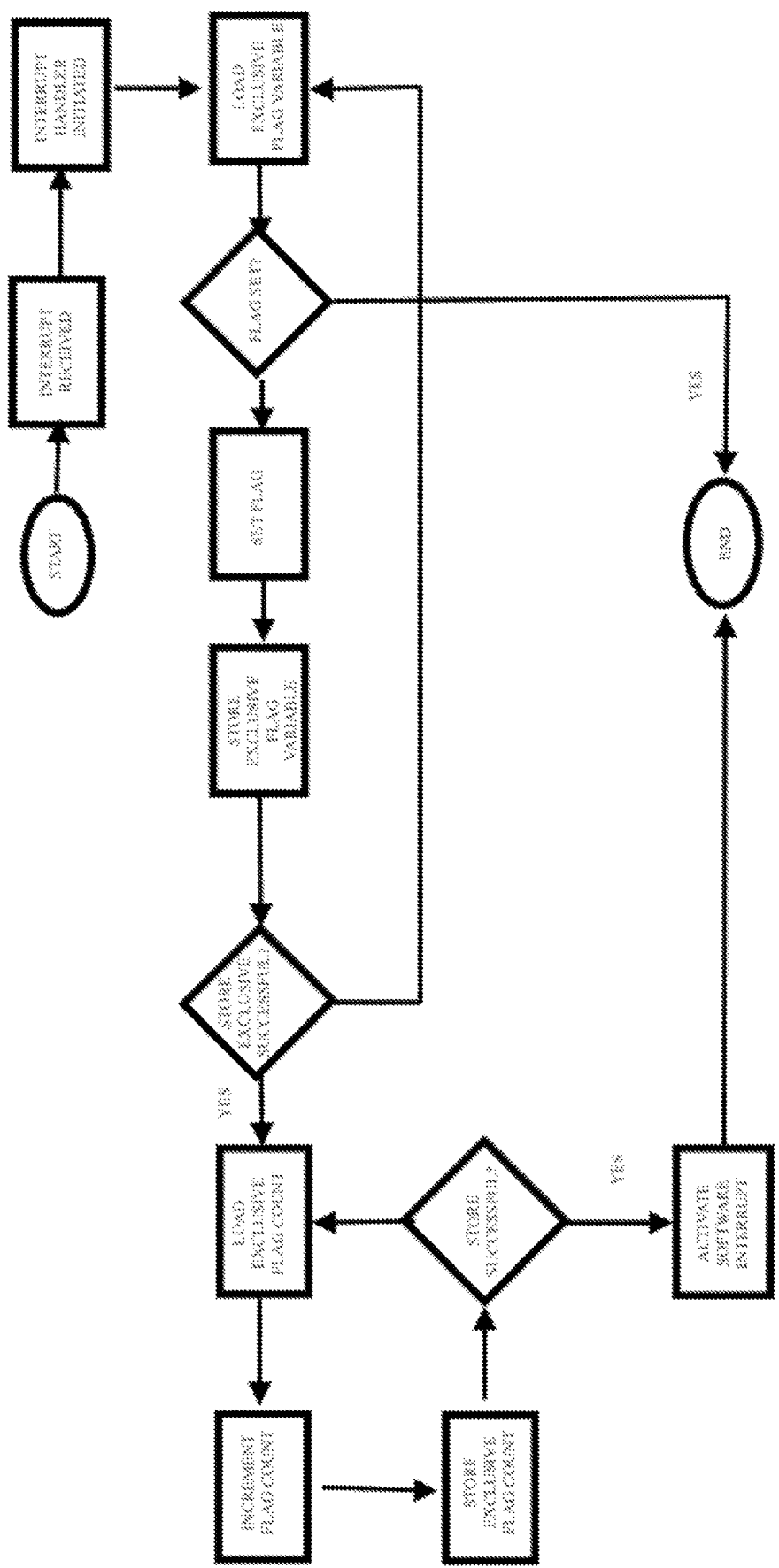
FIG. 3 Implementation 2 depiction of the steps in which a hardware interrupt handler on an ARM architecture could set its flag, increment the flag count, and activate the software interrupt.
Figure 4:
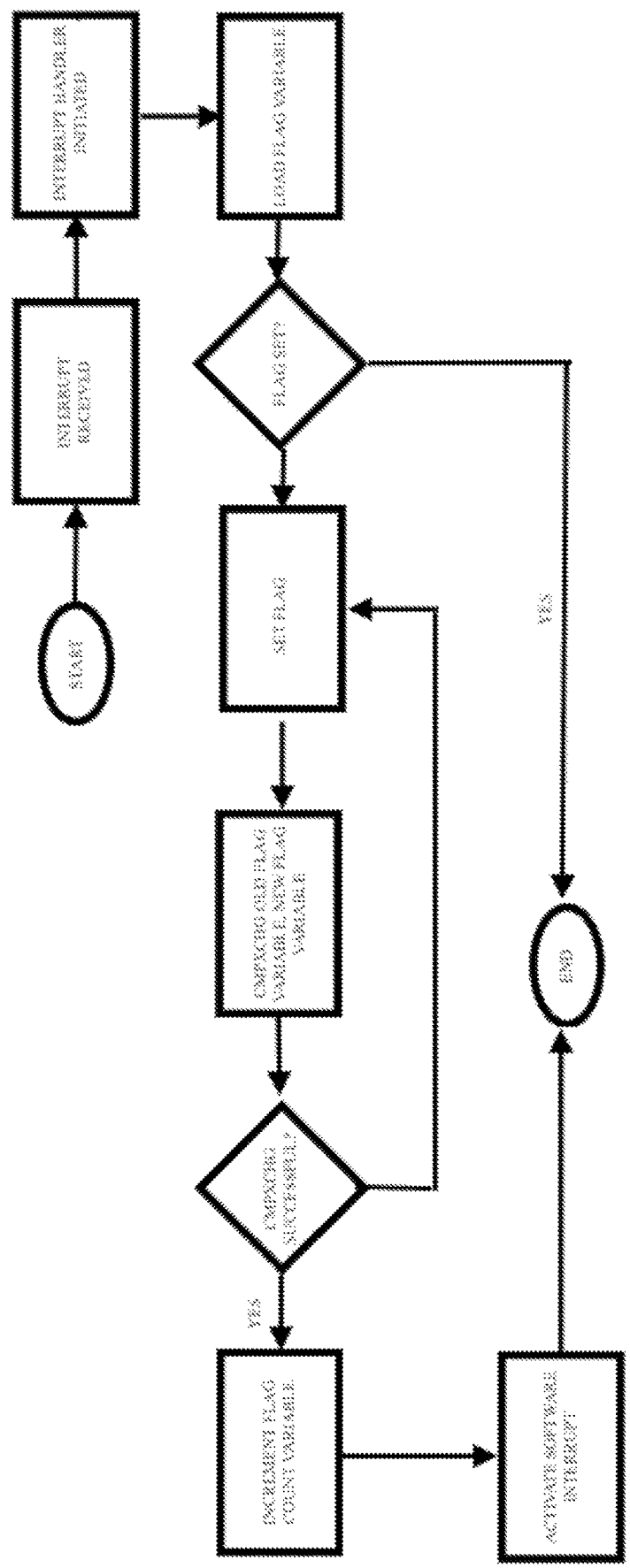
FIG. 4 Implementation 2 depiction of the steps in which a hardware interrupt handler on an x86 architecture could set its flag, increment the flag count, and activate the software interrupt.

The invention comprises two distinct implementations. In the first, the only added cost is memory. The requirement will at maximum be between 0.5 KB and 1 KB for most systems, but could be far less for simpler systems. In the second implementation, the cost is in the context switching time. This added cost, as will be shown, is quite minimal.

A key component of the invention is the handling of synchronization primitives such as semaphores and mutexes. For simplicity, only semaphores, which are the most basic task synchronization primitive that all others are built upon, will be discussed. In the first implementation, any semaphore that is set in an interrupt handler, is copied to memory, and handled in a software interrupt handler that is subsequently activated. Specifically, a reference to the semaphore is copied into a relatively large (0.5 KB-1 KB) circular memory buffer. The software interrupt handler then proceeds to processes all semaphores that may unblock a task. After task states have been updated, the RTOS/OS can now, pick the next highest priority task to run, and perform the core part of the context switch. Note also that if, at any time, including during the core part of the context switch when the processor states are being saved and updated, an interrupt occurs, it can simply be processed. The interrupt handler will release a semaphore, and then store the reference to that semaphore in the buffer, and finally it will activate the software interrupt. However, since the software interrupt was already active, and was interrupted, and also since the interrupt controller supports tail chaining of interrupts, the software interrupt will be set to be in a pending state, such that immediately after it exists, it will clear the pending state and re-execute, at which point the newly released semaphore will be discovered in the buffer and handled.

Note that in the case of a 0.5 KB buffer, and assuming 4 byte addresses, 128 semaphores concurrently released from interrupt handlers is supported. Such a circumstance is not likely, and a buffer of half the size (only 256 bytes) supports 64 such concurrently released semaphores.

It is important to consider how the buffer containing the semaphore references is accessed. It is written to by potentially many nested hardware interrupt handlers, and read from by the software interrupt handler. These operations cannot be interrupted. To understand the consequences of such an interruption, consider, for example, the case where two interrupt handles A (high priority) and B (low priority) are nested. Specifically, interrupt handler B executes first, and in the system call to release the semaphore, the copying of the semaphore reference to the buffer occurs as such:

1. The head of the circular buffer is read from memory.
2. The semaphore reference is stored at the location of the head.
3. The head of the circular buffer is incremented.

If after step 2 executes, the interrupt handler B is interrupted by interrupt handler A, then interrupt handler A will copy its semaphore reference to the circular buffer by first reading the head variable, then storing its semaphore reference at the head location. The head variable read by interrupt handler A is the same one that was used by interrupt handler B, since interrupt handler B did not yet increment it. Thus when interrupt handler A stores its semaphore reference at the head location, it will effectively overwrite interrupt handler B's semaphore reference.

Assembly language instructions for these exact circumstances are standard in most modern architectures. For example ARM architectures contain the load and store exclusive instructions and x86 architectures include the cmpxchg instruction.
For information about the load/store exclusive, the reader is directed to: http://infocenter.arm.com/help/topic/com.arm doc.ddi0360f/BABCFJCG.html
For information about the cmpxchg, the reader is directed to: https://www.felixcloutier.com/x86/CMPXCHG.html
In the previous example, if the load/store exclusive instructions are utilized, then the logic will be as follows: Interrupt handler B will load exclusive the head variable, it will then increment it, and store exclusive. If successful, then the old value of the head variable can be used to place its semaphore reference in the buffer. It is a similar process for the x86 cmpxchg instruction. See FIG. 1,2 respectively.

Once the software interrupt handler executes, it can proceed to read any semaphore references from the tail of the circular buffer placed there by any hardware interrupt handlers and change the state of any tasks from blocked to ready as needed, and then proceed to select the next suitable task to run.

In the case that a semaphore is released from a task, then utilizing the same circular buffer is not possible. The task may successfully increment the head of the circular buffer, but it is not guaranteed to be given the opportunity to store it's semaphore reference in the buffer before the software interrupt handler executes, since an interrupt may occur, and the-hardware interrupt handler will, itself, activate the software interrupt. The solution here is, to simply have another buffer (it is in fact of size one) specifically for semaphores released from a task. The software interrupt handler will examine this buffer after emptying out the circular buffer utilized for semaphores released from interrupt handlers. After processing any semaphore references discovered there, the buffer is nulled out.

Finally the case in which a task attempts to take a semaphore that is zero (and thus block) is considered. Here once the task is blocked, it is typically added to a list of tasks that are blocked on that semaphore. This list is maintained by the semaphore itself. From within a task, adding an element to a list that will be read from the software interrupt handler causes inconsistencies. This has already been established in the case that a semaphore is released from a task, where, instead of utilizing the same circular buffer used for hardware interrupt handlers, another buffer of size one was utilized. And thus a similar solution is applied for the case in which a task attempts to take a semaphore that is zero and blocks. That is, a third buffer (also of size one) is specifically designated. The difference here, however, is that it does not suffice to only include a reference to the semaphore that caused the block, since the blocked task needs to be added to the list of tasks blocked on that semaphore. So, a reference to a simple structure that contains both the reference to to the semaphore and to the task is stored in that buffer instead (this is allocated on the heap by the blocking task and freed by the software interrupt). After processing any semaphore/task references discovered there, the buffer is nulled out.

Now the second implementation of the invention will be discussed. In this implementation, the circular buffer is not required. This is useful for systems that are extremely memory constrained. Even in such systems, there is never a need for the RTOS/OS to disable interrupts. Instead of the circular buffer, flags are associated with semaphores released from interrupt handlers. The RTOS/OS keeps track of the number of semaphores as they are created, and allocates a suitable sized variable that contains the smallest number of bits needed to represent each one. For example, if there are 8 semaphores, then the RTOS/OS will allocate a byte. If subsequently, the user creates a ninth semaphore, the RTOS/OS will update the variable to be 2 bytes. If subsequently, the user creates a seventeenth semaphore, the RTOS/OS will update the variable to be 4 bytes. Most architectures are limited to loading and storing 4 bytes in each instruction. With 4 bytes, 32 semaphores can be handled. In fact, even in such architectures, it will be shown that 64 semaphores can be handled, and 128 semaphores with minimal additional overhead. Some architectures support loading and storing 8 bytes in one instruction and the RTOS/OS can easily be made to take advantage of this, allowing for 256 semaphores.

Whenever a semaphore is released from a hardware interrupt handler, then the bit associated with the semaphore is set, and the software interrupt is activated. The software interrupt handler will begin executing immediately after any other interrupt handlers return. The software interrupt handler must first discover which semaphore has been set. Here is where a key concept of this implementation of the invention lies. Simply cycling through each bit to see if it has been set can introduce an unacceptable delay to the context switching time. For example in a system with 128 semaphores this would be an additional 128 iterations. In order to significantly reduce the time associated with this step, a binary search is performed. This is in fact why the flags were stored, as bits, rather than, for example, in an array. A decrease from O(n) to O(log n) will reduce 128 steps to only 7 steps. This is a great improvement. For example, in a system with 128 semaphores, and an architecture that supports moving 8 bytes to and from memory, two 64 bit variables can be used. Assuming exactly one semaphore was set, the steps to discover which one it was arc as follows:

1. If the first variable is zero, then choose the second variable else choose the first.

2. If the variable&0x00 00 00 00 ff ff ff ff is zero, then choose the most significant 32 bits else choose the least significant 32 bits. Denoted v32.

3. If v32&0x00 00 ff ff is zero, the choose most significant 16 bits else choose the least significant 16 bits. Denoted v16.

4. If v16&0x00 ff is zero, choose most significant 8 bits else choose the least significant 8 bits. Denoted v8.

5. If v8& 0x0f is zero, choose most significant 4 bits else choose the least significant 4 bits. Denoted v4.

6. If v4&3 is zero choose most significant 2 bits else choose the least significant 2 bits. Denoted v2.

7. If v2&1 is zero choose most significant bit else choose least significant bit.

In a system with 128 semaphores, and an architecture that supports moving only 4 bytes to and from memory, four 32 bit variables can be used. It may seem that that in this case, the first step, in the worst case, will require 3 steps (i.e. eliminating 3 of the four variables as being zero). It can in fact be done in only 2 steps, thus adding only one more step to the previous solution with an architecture that supports moving 8 bytes to and from memory, and using two 64 bit variables. This is done by performing a logical OR on 2 of the 32 bit variables and checking for a nonzero result. Thus even on an architecture that only supports moving 4 bytes to and from memory, 128 semaphores can be searched in only 8 steps.

Note that in order to decrease processing time, all operations should be performed on the same variable. Note also, that after discovering which bit was set, it must be cleared. The RTOS/OS can now unblock the associated task, pick the next highest priority task to run, and perform the core part of the context switch. Note also that, as in the first implementation of the invention, if, at any time, including during the core part of the context switch when the processor states are being saved and updated, an interrupt occurs, it can simply be processed.

Figure 5:
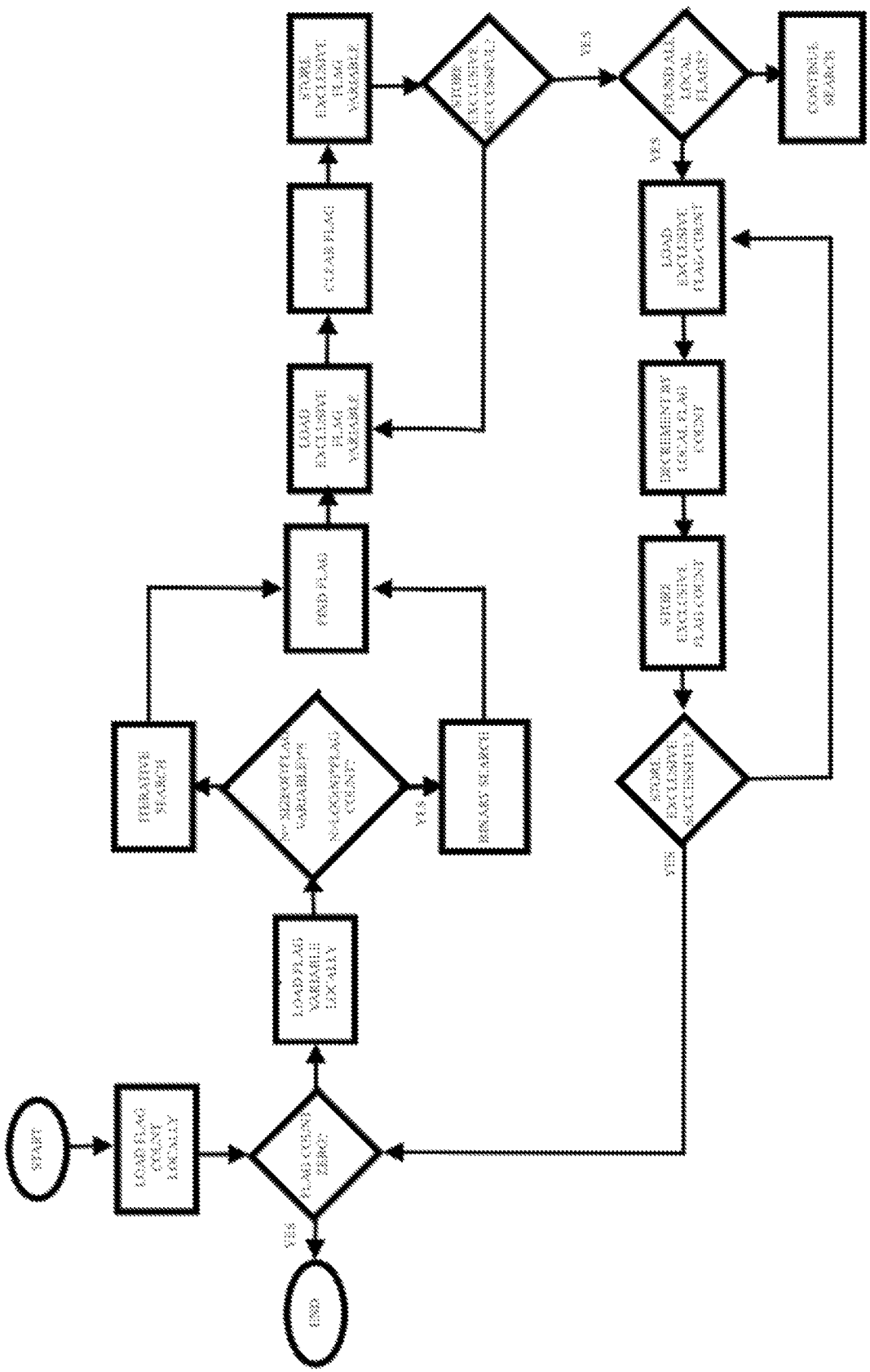
FIG. 5 Implementation 2 depiction of the steps in which a software interrupt handler on an ARM architecture could process the flag count and clear all flags set by any hardware interrupt handlers.

Note also that in the case of multiple simultaneous interrupts, the added overhead will be decreased. For example: In a system with 64 semaphores that are each released from a separate interrupt handler, if a single interrupt occurs, then the added context switching overhead to discover the semaphore would be 6 steps. However, if all 64 interrupts occur simultaneously, then it would wasteful to require 6*64=384 additional steps (although this still evaluates to only 6 steps per each context switch). Instead of performing the 6 step binary search 64 times, at this point it would be more efficient to loop through all 64 bits once. Thus, it would be useful to be able to check how many semaphores are set prior to initiating the binary search. Concretely, if the number of steps needed to discover a semaphore, must be repeated enough times (once for each semaphore set), such that the total number of steps is greater than the number of bits, then looping through the bits becomes a more efficient solution. And if this is the case, then the added overhead for each context switch is effectively reduced even further. In order to be able to implement such a check prior to implementing the search, a total count of the number of flags set must be kept. This is most easily done at the same time when the flag associated with semaphore is set. That is, for example, in the system call to release a semaphore, after the flag associated with the semaphore is set, the total number of set flags is incremented. The software interrupt handler can then check this number before deciding what search mechanism is the most efficient. As before, upon discovering each set bit, it must cleared, but additionally the variable representing the total number of flags set, must be decremented. See FIG. 5,6.

It is important to consider how the bits that represent the flags are set and cleared, and also, how the variable representing the total number of flags set, is updated. Each of these operations cannot be interrupted. To understand the consequences of such an interruption, consider, for example, the case where two interrupt handles A (high priority) and B (low priority) are nested. Specifically, interrupt handler B executes first, and in the system call to release the semaphore, the setting of the flag occurs as such:

1. The variable that contains all the flags is read from memory.
2. The bit associated with this semaphore is set.
3. The variable that contains all the flags is written back to memory.

If before step 3 executes, the interrupt handler B is interrupted by interrupt handler A, then interrupt handler A will set its flag by first reading the variable that contains all the flags, then setting its bit in that variable, and finally writing it back to memory. But when interrupt handler B resumes and executes step 3, the variable that it writes to memory is the one it read from memory before interrupt handler A executed, thus it does not contain the bit set by interrupt handler A. This will have the effect that interrupt handler A will seem to have never executed. Similar circumstances occur when the software interrupt handler clears flags, and with the updating of the variable representing the total number of flags set.

Figure 6:
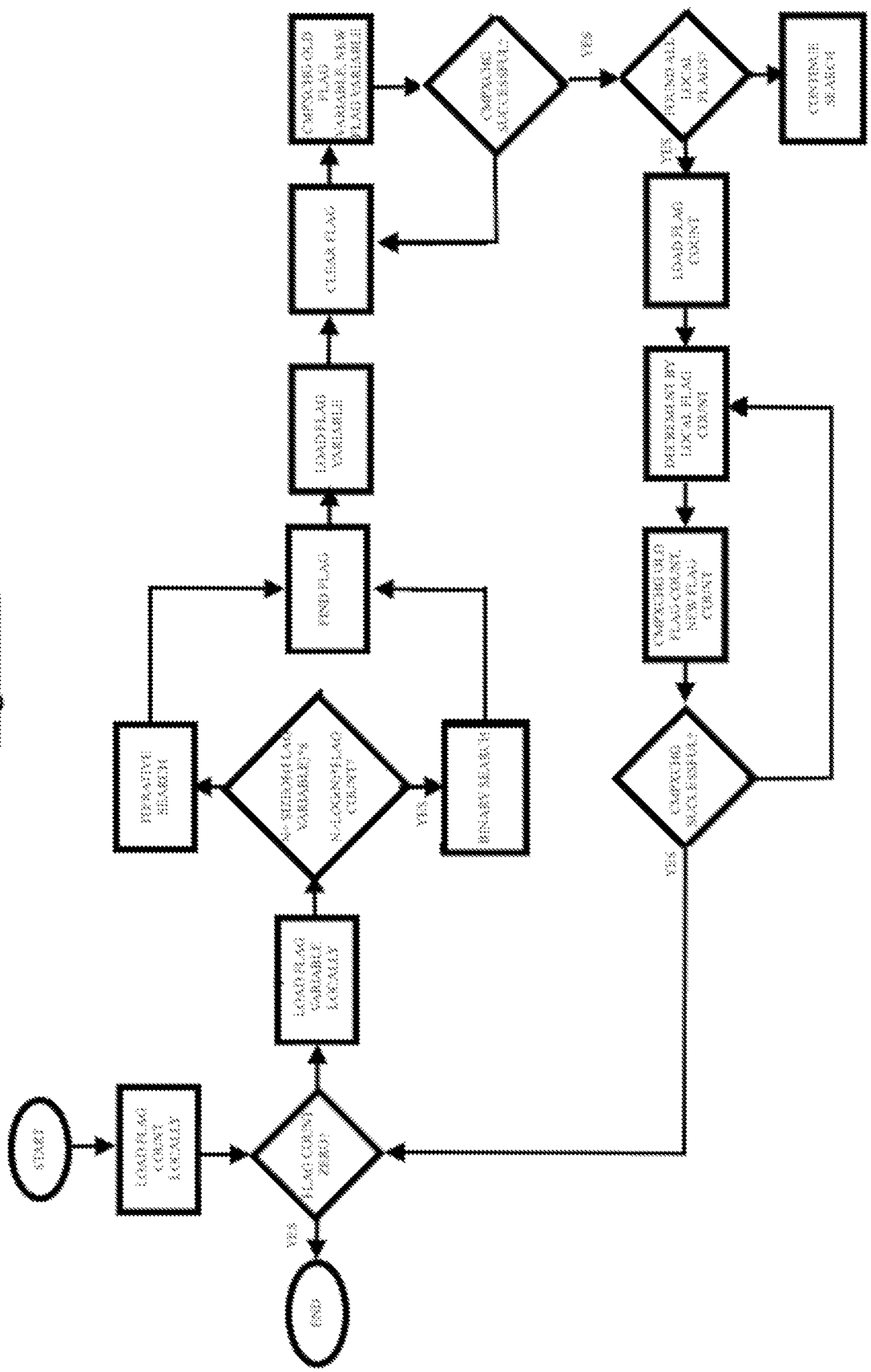
FIG. 6 Implementation 2 depiction of the steps in which a software interrupt handler on an x86 architecture could process the flag count and clear all flags set by any-hardware interrupt handlers.

As in the first implementation of the invention, assembly language instructions for these exact circumstances which are standard in most modern architectures are utilized (e.g. ARM load and store exclusive and x86 cmpxchg). See FIG. 6,7.

As in the first implementation of the invention, the case in which a semaphore is released from a task and the case in which a semaphore causes a task to block must be considered. The solution in the second implementation is identical to that of the first implementation.

Finally, in both implementations, in the context switch within the software interrupt handler, the architecture includes an additional check before executing the core part of the context switch (i.e. when the processor states are being saved and updated). Here the system checks for any new semaphores, and if discovered, will return from the software interrupt handler immediately, only to re-execute it (the interrupt controller would have placed it in a pending state) and update the list of tasks ready to run. This time it may select a different one of a higher priority. Essentially, the purpose of this final check is to try to avoid processing the core part of the context switch if it is discovered that the software interrupt handler will have to be re-executed anyway because new semaphores have been set, and it is possible that another task might be selected to be the one that runs next.

Note that this novel architecture, in which all context switching logic is performed within the software interrupt handler, provides for a simple multi-core implementation. Since the hardware has information regarding when the context switching logic is taking place (software interrupt active or active and pending), blocking cores from executing their software interrupt handler when another core's software interrupt is active or active and pending, can be done purely in hardware.

What is claimed is:

1. A context switching method for real-time operating systems (RTOS), that execute on hardware with an advanced interrupt controller that supports nesting and tail chaining of prioritized interrupts, which never disables interrupts by handling semaphores released by hardware interrupt handlers in a low priority software interrupt, the method comprising:

Responsive to an interrupt occurring, releasing, by a hardware interrupt handler, a semaphore associated with the interrupt;

Storing, by the hardware interrupt handler, a reference to the semaphore in a circular buffer, wherein the storing comprises:
Reading a head of the circular buffer,
Storing the semaphore reference at the location of the head,
Incrementing the head of the circular buffer, Responsive to the storing of the semaphore reference, activating a low priority software interrupt handler;

Reading, by the low priority software interrupt handler, from a tail of the circular buffer, the semaphore reference stored by the hardware interrupt handler;

Responsive to the reading of the semaphore reference, unblocking a task associated with the semaphore and executing context switching associated with the unblocked task.

2. A context switching method for real-time operating systems (RTOS), that execute on hardware with an advanced interrupt controller that supports nesting and tail chaining of prioritized interrupts, which never disables interrupts by handling semaphores released by hardware interrupt handlers in a low priority software interrupt, the method comprising:
  Responsive to an interrupt occurring, releasing, by a hardware interrupt handler, a semaphore associated with the interrupt;
  Accessing a shared bitmap variable comprising a plurality of bits in a memory, wherein one of the bits is associated with the semaphore;
  Setting, by the hardware interrupt handler the bit associated with the semaphore, wherein the setting comprises:
    Reading the shared bitmap variable from the memory,
    Setting the bit associated with the semaphore in the shared bitmap variable,
    Writing back the shared bitmap variable to the memory,
  Responsive to the setting of the bit associated with the semaphore, activating a lower priority software interrupt handler;
  Performing, by the low priority software interrupt handler a binary search on the shared bit map variable to discover which bit has been set;
  Responsive to the discovering of the set bit, unblocking a task associated with the semaphore and executing context switching associated with the unblocked task.

* * * * *